United States Patent [19]
Arai et al.

[11] Patent Number: 5,706,353
[45] Date of Patent: Jan. 6, 1998

[54] RECORDING AND/OR REPRODUCING APPARATUS

[75] Inventors: Toshio Arai, Tokyo; Takashi Kubo, Kanagawa; Kazutaka Nakashima, Chiba; Kiminobu Ichimura, Tokyo; Mitsuru Ida, Saitama, all of Japan

[73] Assignee: Sony Corporation, Tokyo, Japan

[21] Appl. No.: 547,548

[22] Filed: Oct. 24, 1995

[30] Foreign Application Priority Data

Oct. 31, 1994 [JP] Japan ................... 6-266814

[51] Int. Cl.⁶ .................................................. H04B 3/00
[52] U.S. Cl. ......................... 381/77; 381/25; 381/74; 381/183; 381/187; 379/438
[58] Field of Search .................... 381/25, 74, 183, 381/187, 77; 379/438

[56] References Cited

U.S. PATENT DOCUMENTS

| 4,646,987 | 3/1987 | Peterson . |
| 4,942,617 | 7/1990 | Boylan ................ 381/188 |
| 5,201,003 | 4/1993 | Pavel ..................... 381/25 |
| 5,420,739 | 5/1995 | Yokozawa et al. .......... 360/137 |

FOREIGN PATENT DOCUMENTS

| 0475297 | 3/1992 | European Pat. Off. . |
| 62-082824 | 4/1987 | Japan . |
| 2261869 | 6/1993 | United Kingdom . |

*Primary Examiner*—Forester W. Isen
*Attorney, Agent, or Firm*—Jay H. Maioli

[57] ABSTRACT

A recording and/or reproducing apparatus, such as a tape recorder, includes a recording and/or reproducing unit housed within a main body portion, an electro-acoustic transducing section, an actuating input unit, first and second connection cord assemblies and first and second cord take-up units. The recording and/or reproducing unit records and/or reproduces the information on or from a recording medium, such as a magnetic tape. An electro-magnetic transducer is fed with information signals reproduced by the recording and/or reproducing unit. An actuating input unit, removably mounted on the main body portion, sets or switches the recording or reproducing state of the recording and/or reproducing unit. The first connection cord assembly interconnects the actuating input unit and the recording and/or reproducing unit for exchanging information signals, and the second connection cord assembly interconnects the electro-acoustic transducing unit and the actuating input unit. The first take-up unit is provided in the main body portion for taking up the first connection cord assembly and the second take-up unit is provided in the actuating input unit for taking up the second connection cord assembly.

9 Claims, 12 Drawing Sheets

RECORDING AND/OR REPRODUCING APPARATUS

BACKGROUND OF THE INVENTION

1. Field of the Invention

This invention relates to a recording and/or reproducing apparatus. More particularly, it relates to a recording and/or reproducing apparatus having a cord take-up function.

2. Background of the Invention

A variety of kinds of recording and/or reproducing apparatus, such as a tape recorder, tape player, disc recorder or a disc player, have hitherto been proposed.

Among these recording and/or reproducing apparatus, there is an apparatus in which a recording and/or reproducing unit for recording and/or reproducing information signals is accommodated within a main body portion and a remoter controller is connected via a cord operating as a connecting member to the recording and/or reproducing unit.

The recording and/or reproducing unit has a loading unit for loading the recording medium, such as a tape cassette or a disc cartridge, an optical pickup device and a magnetic head device.

The remote controller generates actuating signals responsive to the manual operation and transmits the generated actuating signal via the cord to the recording and/or reproducing unit. The recording and/or reproducing unit is responsive to the supplied actuating signal to execute various operations, such as recording, reproduction, music program selection or cessation of operation.

The acoustic signals outputted by the recording and/or reproducing unit are converted into sound by an electro-acoustic transducer connected via the cord to the recording and/or reproducing unit, that is, the headphone unit.

The cord interconnecting the recording and/or reproducing unit and the remote controller and the cord interconnecting the recording and/or reproducing unit and the headphone device are unified together and taken up by a cord reel rotatably mounted within the main body portion so as to be housed therein.

If, with the above-described recording and/or reproducing apparatus, the remote controller is provided partway on the cord interconnecting the recording and/or reproducing unit and the headphone device, it is not possible to take up the cord in its entirety on a cord reel provided in the main body portion.

It may be envisaged to use a cord for interconnecting the recording and/or reproducing unit and the remote controller and another separate cord for interconnecting the recording and/or reproducing unit and the headphone device and to provide separate cord reels for taking up the respective cords.

However, if two such cord reels are provided in the main body portion, the main body portion is complex and increased in size. In addition, there is a risk of cord entanglement during reel-out or take-up operations.

SUMMARY OF THE INVENTION

It is therefore an object of the present invention to provide a recording and/or reproducing apparatus which resolves the above-mentioned problems.

According to the present invention, there is provided a recording and/or reproducing apparatus including a recording and/or reproducing unit, a main body portion, an electro-acoustic transducing unit, a connecting unit and first and second take-up units. The recording and/or reproducing unit records/reproduces information signals on or from a recording medium. The main body portion houses recording and/or reproducing means. The electro-acoustic transducing unit is fed with information signals reproduced by the recording and/or reproducing unit. The connection means interconnects the electro-acoustic transducer and the recording and/or reproducing unit. The first take-up unit is provided in the main body portion for taking up the connection means. The second take-up unit is provided partway on the connection means for taking up the connection means. The second take-up is capable of being mounted on and dismounted from the main body portion.

A recording and/or reproducing apparatus, such as a tape recorder, includes a recording and/or reproducing unit housed within a main body portion, an electro-acoustic transducing unit, an actuating input unit, first and second connecting portions and first and second cord take-up units. The recording and/or reproducing unit records and/or reproduces the information on or from a recording medium, such as a magnetic tape. The electro-magnetic transducer is fed with information signals reproduced by the recording and/or reproducing unit. The actuating input unit, removably mounted on the main body portion, sets or switches the recording or reproducing state of the recording and/or reproducing unit. The first connecting portion interconnects the actuating input unit and the recording and/or reproducing unit for exchanging information signals therebetween. The second connecting portion interconnects the electro-acoustic transducing unit and the actuating input unit. The first take-up unit is provided within the main body portion for taking up the first connecting portion. The second take-up unit is provided within the actuating input unit for taking up the second connecting portion.

DESCRIPTION OF THE INVENTION

Referring to the drawings, the construction of a recording and/or reproducing apparatus according to the present invention will be explained in detail. In the following embodiment, a tape player as a recording and/or reproducing apparatus employing a tape cassette having housed therein a magnetic tape as a recording medium is explained as a recording and/or reproducing apparatus. The present embodiment is explained in the following order.

Figure 1:
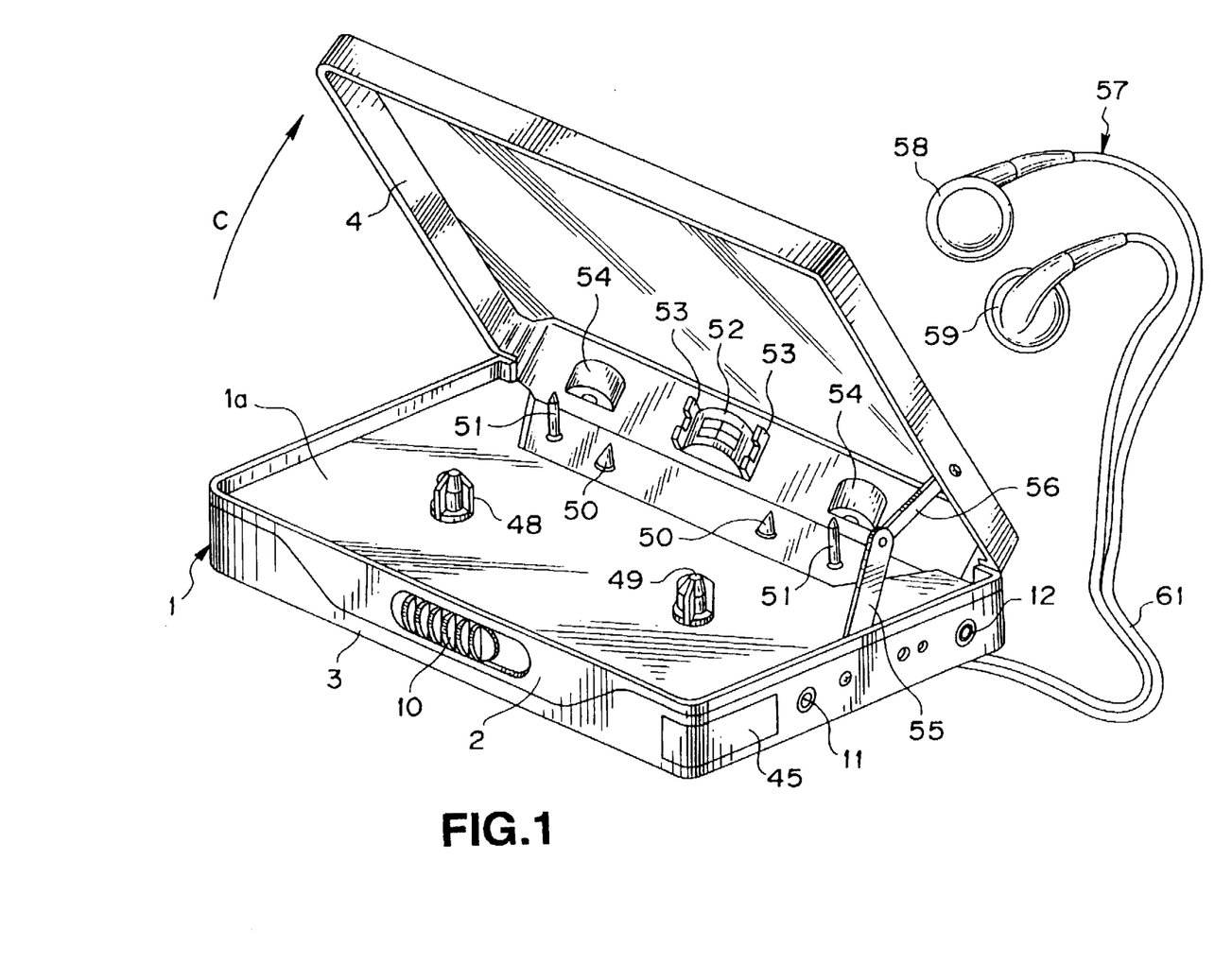
FIG. 1 is a perspective view showing an arrangement of a tape recorder as a recording and/or reproducing apparatus according to the preset invention.

(i) Main Body Portion
(ii) Remote Controller
(iii) First Cord Reel
(iv) Headphone Device
(v) Second Cord Reel
(vi) Remote Controller Holder
(vii) Headphone Holder
(viii) Operation of Tape Player (i) Main Body portion The tape player has a main body portion 1, as shown in FIG. 1. The main body portion 1 is comprised of an outer casing having a chassis 2, a front panel 3 mounted on the front surface of the chassis 2 and a cassette lid 4 mounted on the rear surface of the chassis 2.

The front panel 3 is mounted on the chassis 2 by e.g., set screws, not shown.

The cassette lid 4 is rotatably supported along one side with respect to the chassis 2. The cassette lid 4 is mounted for rotation between the position of being abutted against the chassis 2 and the position separated from the chassis 2 in a direction in which the opposite lateral side of the lid 4 is displaced away from the chassis 2, as indicated by arrow C in FIG. 1.

The cassette 4 is held by a lid lock mechanism, not shown, provided within the chassis 2, so as to be abutted against the chassis 2. By operating a retention release lever 10 provided on the chassis 2, the cassette lid 4 is released by the above-mentioned lid lock mechanism so as to be rotated away from the chassis 2 in a direction as indicated by arrow C in FIG. 1.

Between the chassis 2 and the front panel 3, a circuit substrate carrying an electronic circuit, not shown, constituting a recording and/or reproducing unit acting as recording and/or reproducing means, is mounted on the chassis 2 and accommodated in the main body portion 1.

The space between the chassis 2 and the back side of the cassette lid 4 operates as a tape cassette housing section 1a. On the back surface of the chassis 2 are mounted reel driving shafts 48, 49 constituting the recording and/or reproducing unit for being protruded into the tape cassette housing section. These reel driving shafts 48, 49, run in rotation by a motor arranged on the chassis, engage with a pair of tape reels of the tape cassette, not shown, loaded on the tape cassette housing section, for driving these tape reels.

On the back surface of the chassis 2 are arranged a pair of capstan shafts 51, 51 and a pair of cassette positioning pins 50, 50, constituting the recording and/or reproducing unit, for being protruded into the inside of the tape cassette housing section 1a. These cassette positioning pins 50, 50 are engaged in positioning holes formed in the main body portion of the tape cassette for positioning the tape cassette. The capstan shafts 51, 51 are run in rotation by a motor, not shown, arranged within the chassis 2, while being abutted against the magnetic tape housed within the tape cassette for feeding the magnetic tape in the forward direction and/or in the reverse direction.

On one side of the cassette lid 4 are mounted a pair of pinch rolls 54, 54 and a recording and/or reproducing head 52 constituting the recording and/or reproducing unit.

The head 52 is in sliding contact with the magnetic tape for reading out acoustic signals from the magnetic tape. The pinch rolls 54, 54 are formed of a material having a high frictional coefficient, such as rubber, and sandwich the magnetic tape in cooperation with the capstan shafts 51, 51 for assuring the feed operation of the magnetic tape brought about by the capstan shaft 51.

A pair of tape guide members 53, 53 are mounted on both sides of the head 52. These tape guide members 53, 53 permit the magnetic tape to pass through central recesses thereof for setting the running position of the magnetic tape with respect to the head 52. The chassis 2 and the cassette lid 4 have their mid portions connected together by link members 55, 56 connected together for rotation relative to each other.

These link members 55, 56 are mounted for rotation relative to the chassis 2 and the cassette lid 4 for controlling the opening angle between the chassis 2 and the cassette lid 4.

Figure 2:
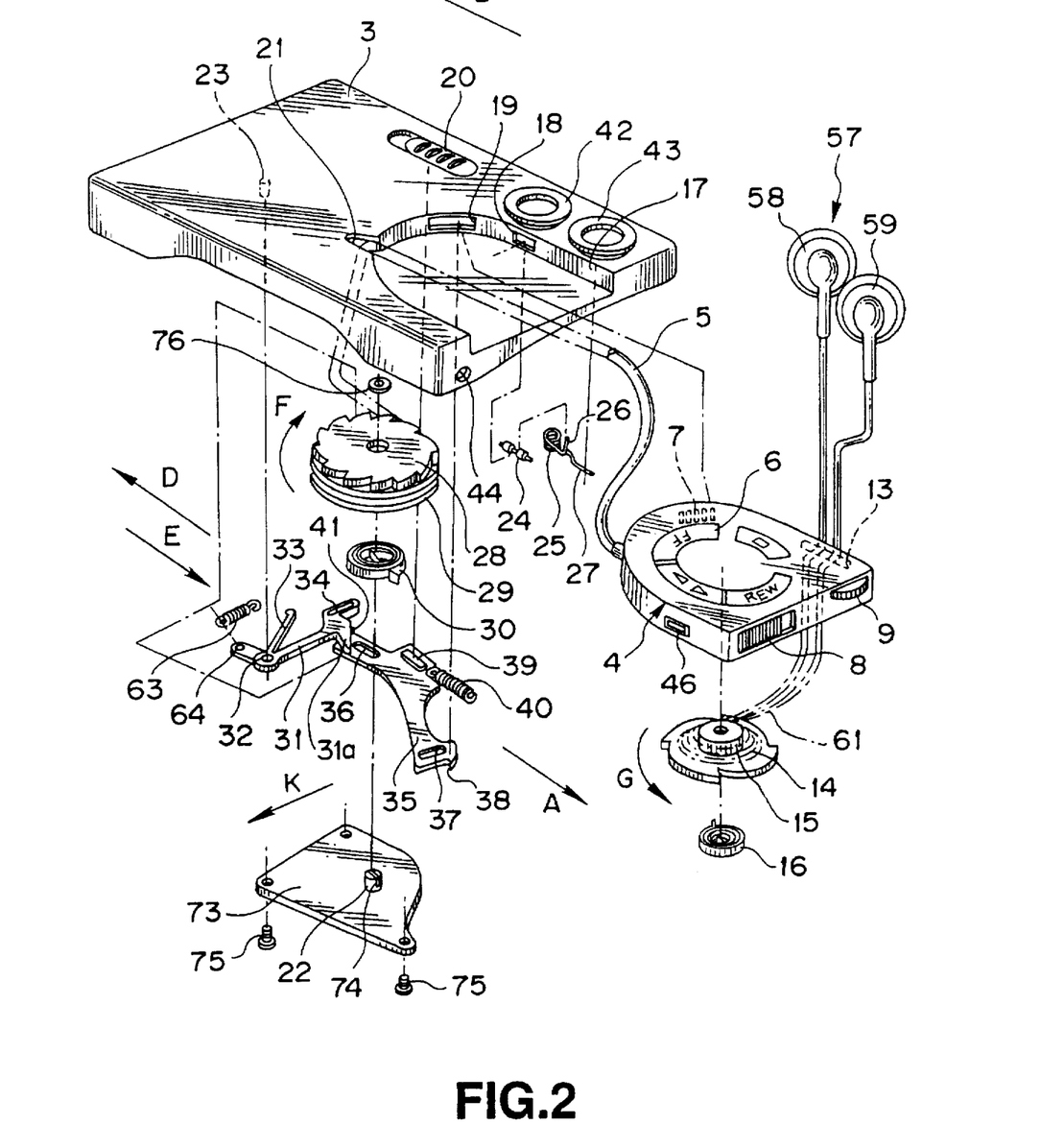
FIG. 2 is an exploded perspective view showing an arrangement of an outer casing of a main body portion of a tape recorder shown in FIG. 1.
Figure 3:
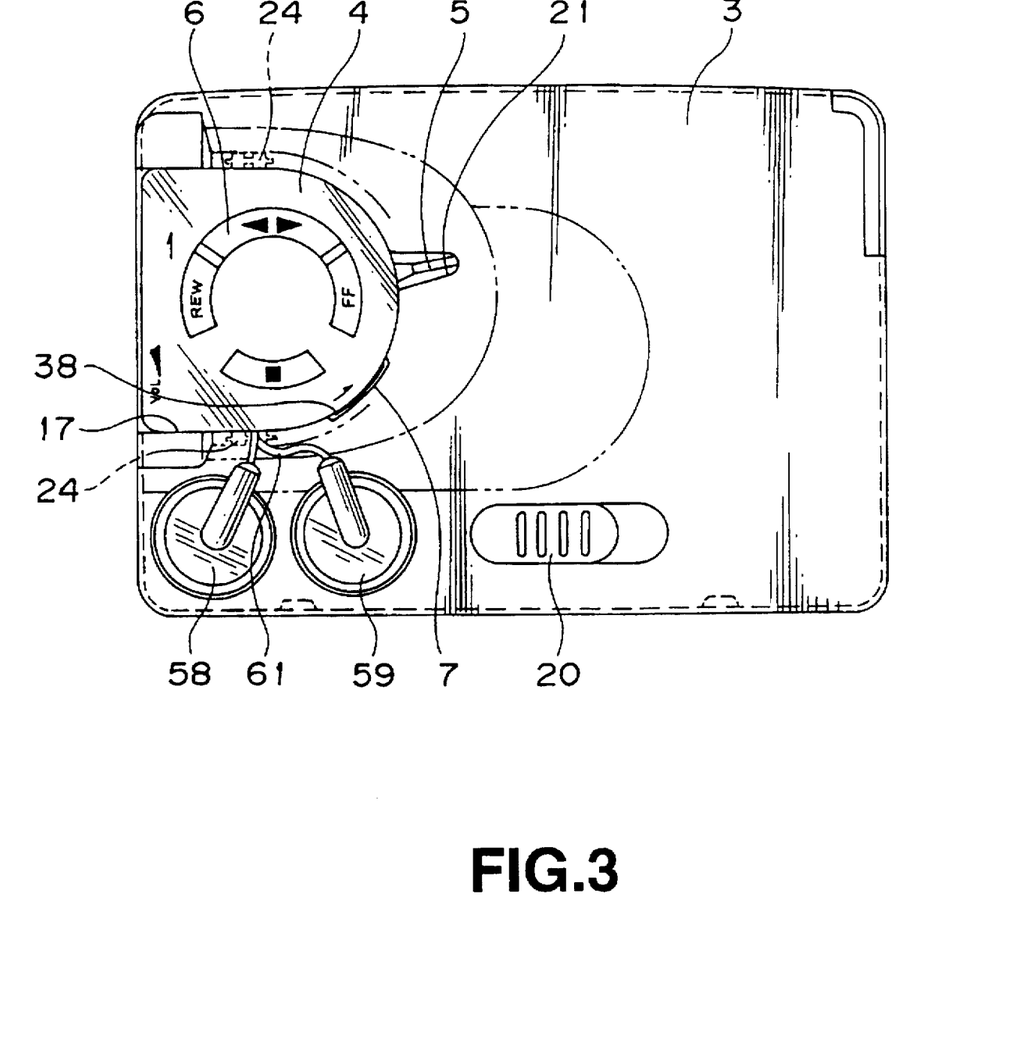
FIG. 3 is a plan view showing an arrangement of the tape recorder shown in FIG. 1.

A remote controller holder 17, as later explained, is accommodated and held in the vicinity of one of the lateral edges of the front panel 3, as shown in FIGS. 2 and 3. The remote controller holder 17 is formed as a recess corresponding in shape to a remote controller as later explained for accommodating the remote controller therein.

(ii) Remote Controller

Figure 4:
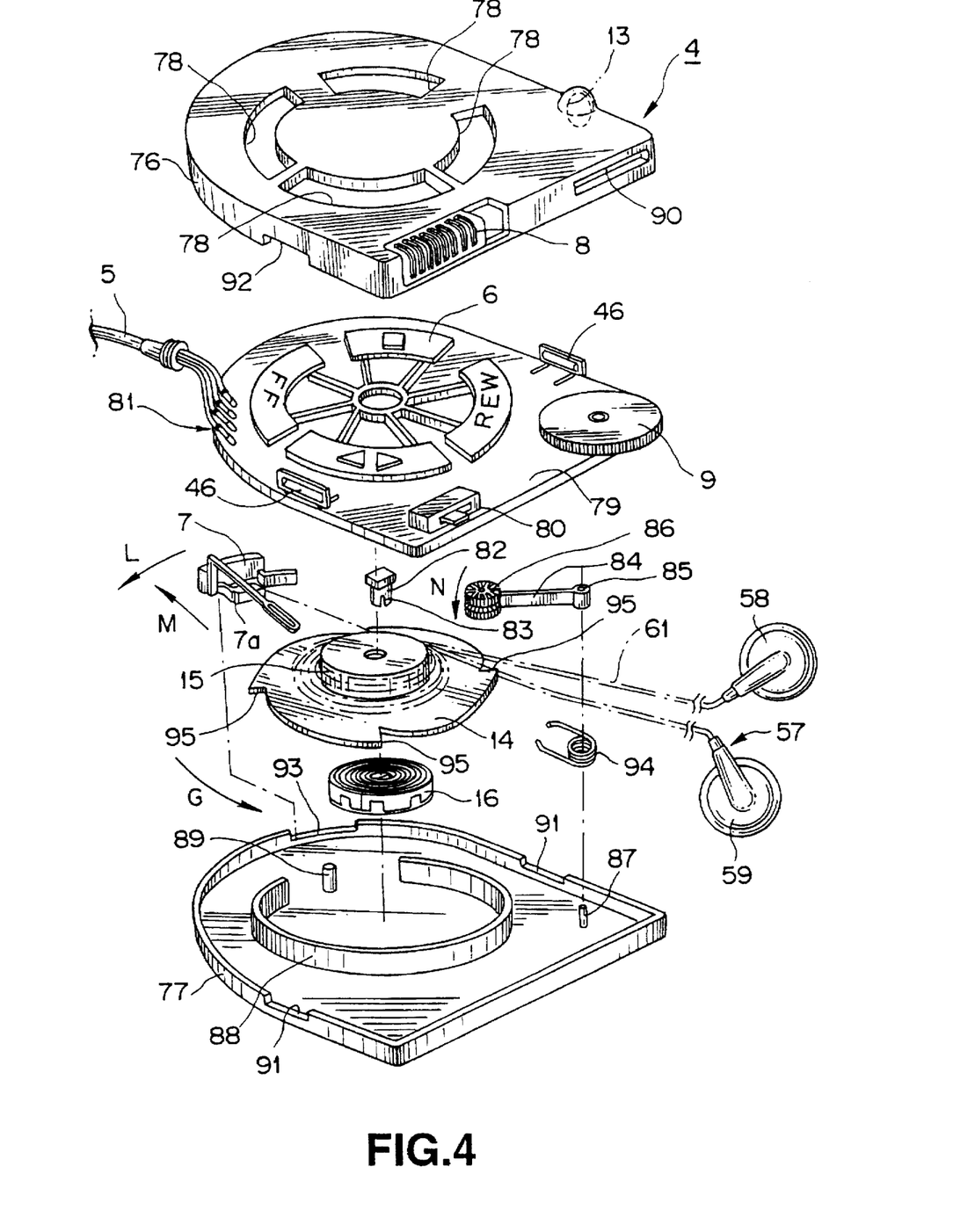
FIG. 4 is an exploded perspective view showing an arrangement of a remote controller.

The remote controller 4 has a casing formed by abutting an upper casing 76 and a lower casing 77 to each other, and a circuit substrate 79 carrying an electronic circuit for remote control accommodated within the casing, as shown in FIG. 4.

The circuit substrate 79 is connected by a first cord assembly 5 and a first cord reel 29 as later explained to the circuit substrate of the recording and/or reproducing unit. Plural cords of the first cord assembly 5 are soldered at first ends thereof to pre-set lands 81 on a circuit pattern of the circuit substrate 79.

The first cord assembly 5 is used for exchanging sound signals outputted by the recording and/or reproducing unit and operating signals entering the recording and/or reproducing unit from the remote controller 4 between the circuit substrate of the recording and/or reproducing unit and the circuit substrate 19.

On the circuit substrate 79 are arranged plural diaphragm switches, a hold switch 80, a volume control 9 and a pair of lock groove members 46, 46 operating as second contacts for operating signals.

On the diaphragm switches are arranged plural associated pushbuttons constituting an operating switch 6. These pushbuttons are integrally formed of a flexible synthetic resin material with supporting rods of a smaller diameter. That is, the respective pushbuttons are arranged as a unitary member and are arrayed in an arc via the supporting rods.

The pushbuttons constituting the operating switch 6 face the spacing above the remote controller 4 via plural through-holes 78 formed in the upper surface of the remote controller 4. By pressing on these pushbuttons from above the remote controller 4, the diaphragm switches associated with the pressed pushbuttons are pressed and actuated.

The pushbuttons constituting the operating switch 6 are used as a playback switch PLAY, indicated by ▶, ◀, a rewind (REW) switch, a fast feed (FF) switch and a stop switch STOP, indicated by ☐ in FIG. 4. That is, the remote controller 4 enters an operating signal associated with the pressed pushbutton in a circuit substrate of the recording and/or reproducing unit.

That is, when the playback switch is pressed, an operating signal for executing the playback mode for feeding the magnetic tape at a pre-set speed associated with the rotating velocity of the capstan shaft 51 in the forward direction or in the backward direction for reading out the acoustic signal by the head 52 is fed to the circuit substrate of the recording and/or reproducing unit for executing the playback mode.

When the rewind switch (REW) is pressed, an operating signal for executing the rewind mode for feeding the magnetic tape in the backward direction at a higher velocity is fed to the circuit substrate of the recording and/or reproducing the unit for executing the rewind operation.

When the stop switch (STOP) is pressed, an operating signal for canceling the operation corresponding to one of the playback, fast feed and the rewind modes as currently set for stopping the operation is fed to the circuit substrate of the recording and/or reproducing unit for canceling the playback, fast feed or rewind mode.

The hold switch 80 is a switch which, when thrown, causes the mode currently being executed to be maintained. This hold switch 80 is actuated by a hold switch slider 8 slidable mounted on an upper cover 78 of the remote controller 4.

The volume 9 is used for adjusting the level of the acoustic signal reaching the circuit substrate 79 via the first cord assembly 5 so as to be subsequently fed to the headphone device which is the electro-acoustic transducer as later explained. A portion of the rotary plate of the volume 9 responsible for level adjustment is exposed to outside of the remote controller 4 via a slit 90 formed in the upper cover 76.

A pair of lock groove members 46, 46 are formed of a conductive material, such as metal, and connected parallel to one of the first cords for exchanging operating signals with the circuit on the circuit substrate 79. These lock groove members 46, 46 are exposed to outside via a pair of through-holes formed on both lateral sides of the remote controller 4. These through-holes are delimited by abutment of cut-outs 92, 92, 91, 91 formed on both lateral sides of the upper and lower covers 76, 77, as shown in FIG. 2.

These lock groove members 46, 46 are formed with groove-shaped recesses on the sides thereof facing outwardly of the remote controller 4.

(iii) First Cord Reel

Within the main body 1, there is mounted a first cord reel 29 for taking up the first cord assembly 5 for housing the first cord assembly within the inside of the main body portion 1, as shown in FIG. 2.

This first cord reel 29 is rotatably carried by a pivot 22 mounted on a relay substrate 73 mounted in turn on the back surface of the front panel 3 by a set screw 75. The first cord reel 29 is positioned between the relay substrate 73 and the front panel 3.

The hub of the first cord reel 29 holds the opposite end of the first cord assembly 5. The opposite ends of the cords constituting the first cord assembly 5 are connected to plural terminal rings provided in the first cord reel 29. These terminal rings are formed of an electrically conductive material, such as metal, and are mounted concentrically with respect to the first cord reel 29.

Figure 5:
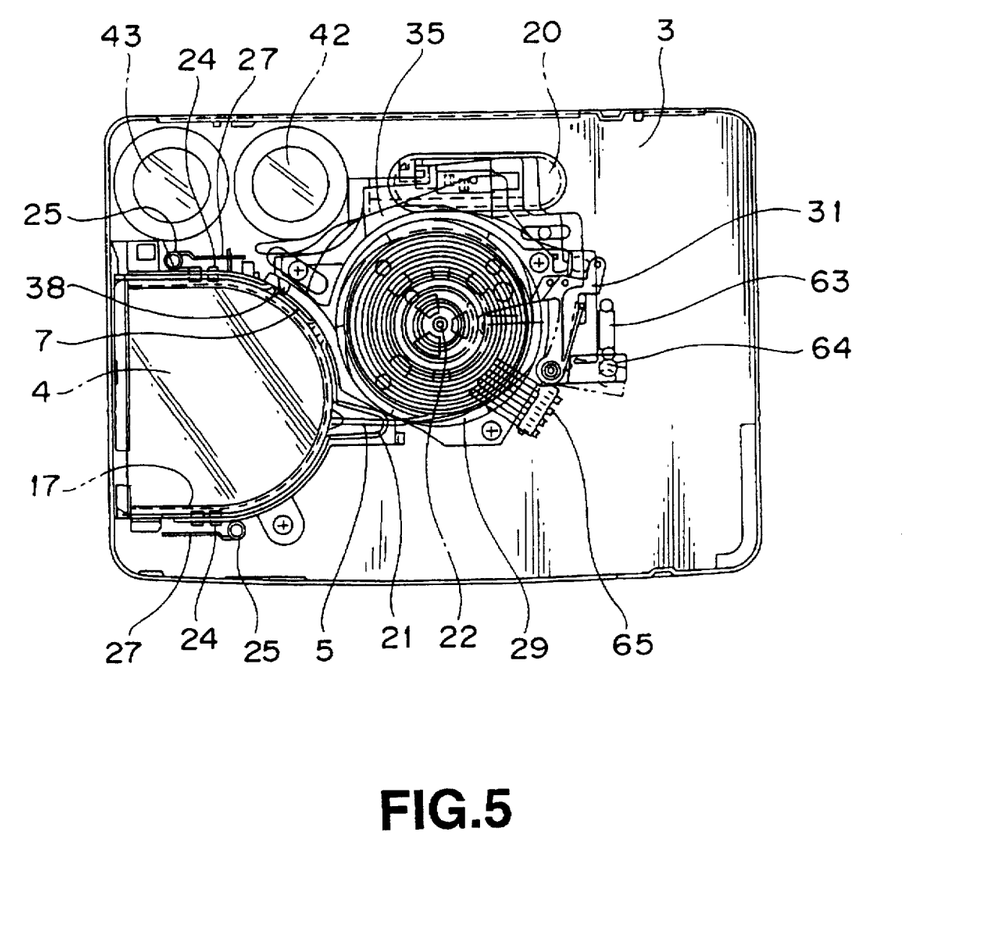
FIG. 5 is a bottom plan view showing an arrangement of an outer casing of a main body portion of the tape recorder shown in FIG. 1.

The terminal rings mounted in the first cord reels 29 are in sliding contact with plural brushes 65 provided on the circuit substrate of the recording and/or reproducing unit so as to be electrically connected by these brushes 65 to the circuit substrate of the recording and/or reproducing unit, as shown in FIG. 5. That is, the cords of the first cord assembly 5 are connected to the circuit substrate of the recording and/or reproducing unit.

The first cord reel 29 is fitted with a first ratchet wheel 28.

The first cord reel 29 is fitted with a first winding spring 30 for rotationally biasing the first cord reel 29 in a direction of taking up the first cord 5.

The first winding spring 30 is wound spirally and has its outer peripheral end portion retained by a hub of the first cord reel 29, while having its inner peripheral end portion retained by a slit 74 formed in the pivot 22.

The first winding spring 30 rotationally biases the first cord reel 29 in a direction of taking up the first cord 5 on the first core reel 29, as shown by arrow F in FIG. 2.

Within the inside of the main body portion 1 is arranged a first inhibiting mechanism for inhibiting rotation of the first cord reel 29 with the possibility of canceling the inhibition again permitting its rotation. The first inhibit mechanism is made up of an inhibiting lever 31 and an inhibit canceling lever 35.

The inhibiting lever 31 is rotatably supported by passing a pivot 23 mounted upright on the back surface of the front panel 3 through a supporting hole 32 in the proximal end of the lever 31. The inhibiting lever 31 has a hook-shaped retention portion 31a at the distal end thereof for engaging with a tooth of the first ratchet wheel 28.

The inhibiting lever 31 is rotationally biased by a spring plate portion formed integrally therewith and a tension coil spring 63 in a direction of engaging its retention portion 31a with the tooth of the ratchet wheel 28, as shown by arrow E in FIG. 2. The tension coil spring 83 is installed under tension between a retention pin 84 at the proximal end of the inhibiting lever 31 and the back surface of the front panel 3.

The inhibiting lever 31 has its inhibiting portion 31a engaged with a tooth of the first ratchet wheel 28 for inhibiting rotation of the first cord reel 29 under the bias of the first winding spring 30. If, even though the inhibiting lever 31 has its inhibiting portion 31a engaged with the tooth of the first ratchet wheel 28, the first cord reel 29 is rotated in a direction against the bias of the first spring 30, the inhibiting lever 31 has the inhibiting portion 31a slidingly contacted with the first ratchet wheel 28 without inhibiting rotation of the first cord reel 29.

The inhibition canceling lever 35 has guide slits 36, 37. The inhibition canceling lever 35 is slidably supported by having guide shafts set upright on the back surface of the front panel 3 passed through these guide slits 38, 37.

The inhibition canceling lever 35 has its end engagement pin 41 engaged in the engagement slit 34 formed in the foremost part of the inhibit lever 31. The inhibition canceling lever 35 is biased by a tension coil spring 40 in the direction of rotating the inhibit lever 31 for engaging the retention portion of the inhibiting lever 31 with the tooth of the first ratchet wheel 28, as indicated by arrow A in FIG. 2.

The inhibition canceling lever 35 is slid against the bias of the tension coil spring 40 fop rotating the inhibiting lever 31 for separating the retention portion 31a of the inhibiting lever 31 away from the first ratchet wheel 28, as indicated by arrow D in FIG. 2.

The inhibition canceling lever 35 has an associating protrusion 39. The inhibition canceling lever 35 associates the protrusion 39 with a first cord capturing slider 20 slidably mounted within the front panel 3. That is, the first cord capturing slider 20 is supported by an edge of a through-hole formed in the front panel 3 for facing both the front and back sides of the front panel 3. The slider 20 is associated with the associating protrusion 39 of the inhibition canceling lever 35.

The cord capturing slider 20 is slid in a direction indicated by arrow B in FIG. 2 against the bias of the tension coil spring 40 for rotating the inhibiting lever 31 via the inhibition canceling lever 35 for displacing the retention portion 31a of the inhibiting lever 31 away from the first ratchet wheel 28.

When the retention portion 31a of the inhibiting lever 31 is separated away from the first ratchet wheel 28, the first cord reel 29 is rotated under the bias of the first winding spring 30.

(iv) Headphone Device

To the circuit substrate 79 of the remote controller 4 is connected a headphone device 57 via a second cord assembly 61 and a second cord reel 15 as later explained.

Figure 12:
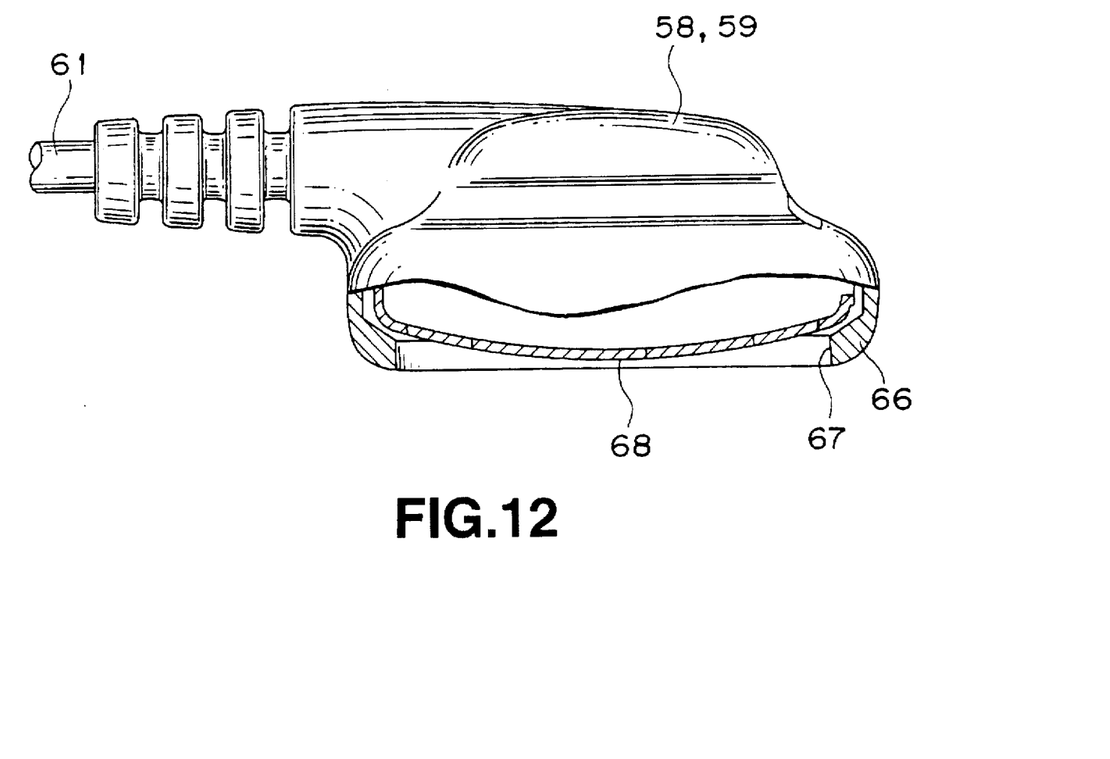
FIG. 12 is a side view showing an arrangement of a unit portion of the headphone device of the tape recorder of FIG. 1, with a portion being broken away.

The headphone device 57 has left and right units 58, 59, as shown in FIGS. 2 and 12. These units 58, 58 are each provided with a speaker 88. Each speaker 88 has a diaphragm, a voice coil attached to the diaphragm and a magnetic circuit for displacing the voice coil, and converts the input electrical signals into sound, which is outputted.

The second cord assembly 61 is comprised of two cords in association with the respective units 58, 59. The second cord assembly 61 is led out of the remote controller 4 via a through-hole 13 formed in the lateral surface of the upper cover 76 of the remote controller 4.

The units 58, 59 are each provided with a cover 66 for sheathing the outer surface of the speaker unit 88. The cover 68 has a sound radiating opening (mouthpiece) 67 for facing the front surface of the speaker 68 operating as the sound radiator to the outside.

The headphone device 57 is supplied with acoustic signals from the circuit substrate of the recording and/or reproducing unit via the second cord 61 and the first cord assembly 5.

(v) Second Cord Reel

Within the remote controller 4, there is rotatably mounted the second cord reel 15 for taking up the second cord assembly 61 and housing the second cord 61 in the remote controller 4, as shown in FIG. 4.

The second cord reel 15 is housed within the remote controller 4 by being rotatably supported by a supporting shaft 82 set upright on the lower surface of the upper cover 76 of the remote controller 4 towards the inner side of the remote controller 4.

The second cord assembly 61 has its one end held by a hub of the second cord reel 15. Each cord of the second cord assembly 61 has its one end connected in association with plural terminal rings provided in the second cord reel 15. These terminal rings are formed of an electrically conductive material, such as metal, and is mounted concentrically with respect to the second cord reel.

Each terminal ring provided in the second cord reel 15 is in sliding contact with plural brushes, not shown, provided on the circuit substrate 79, and is connected by these brushes with the circuit substrate 79 of the remote controller 4.

Each cord of the second cord assembly 61 is connected to the circuit substrate 79 of the remote controller 4 and is connected via the circuit substrate 79 and the first cord assembly 5 to the circuit substrate of the main body portion 1.

The second cord reel 15 carries a second ratchet wheel 14.

The second cord reel 15 is fitted with a second winding spring 16 for biasing the second cord assembly 15 in a direction of taking up the second cord 61.

The second winding spring 16 is wound spirally and has its outer peripheral end portion retained by the hub of the second cord reel 15 while having its inner peripheral end portion retained by a slit 83 formed in the supporting shaft 82.

The second winding spring 16 rotationally biases the second cord reel 15 in a direction of taking up the second cord assembly 61 on the second cord reel 15, as indicated by arrow G in FIG. 4.

Within the remote controller 4 is arranged a second inhibiting mechanism for inhibiting rotation of the second cord reel 15 with the possibility of canceling the inhibition for again permitting the reel rotation. The second inhibiting mechanism is constituted by a retention slider 7.

The retention slider 7 is slidably supported by the edge of a through-hole 93 formed in a lateral surface of the remote controller 4. The inhibiting slider 7 has a retention portion 7a for engaging with a tooth 95 of the second ratchet wheel 14 via its integral spring plate portion.

The inhibiting slider 7 biases the retention portion 7a not engaged with the tooth 95 of the second ratchet wheel 14 by abutting the integral spring plate portion thereof against an abutment pin 89 set upright within the remote controller 4. The retention portion 7a is mounted so as to be directed in a direction opposite to that indicated by arrow L in FIG. 2.

The inhibiting slider 7 causes its retention portion 7a to be engaged with the tooth 95 of the second ratchet wheel 14 for inhibiting rotation of the second cord reel 15 under the bias of the second winding spring 18. The inhibiting slider 7 has its retention portion 7a engaged with the tooth 95 of the second ratchet wheel 14. However, if the second cord reel 15 is rotated against the bias of the second winding spring 18, the retention portion 7a of the inhibiting slider 7 is in sliding contact with the second ratchet wheel 14 without inhibiting rotation of the second cord reel 15.

The inhibiting slider 7 is slid against the bias of the spring plate portion of the slider 7 as indicated by arrow L in FIG. 4, so that the spring plate portion of the slider 7 is abutted against the abutment pin 89 and thereby elastically flexed for displacing the retention portion 7a away from the second ratchet wheel 14.

When the retention portion 7a of the inhibiting slider 7 is moved away from the second ratchet wheel 14, the second cord reel 15 is rotated under the bias of the second winding spring 18.

Within the remote controller 4, there is mounted a slack take-up lever 84 for facing the lateral surface of the second cord reel 15. The slack take-up lever 84 has a supporting hole 85 in its proximal portion which is passed through by an upstanding supporting shaft 87 provided in the remote controller 4 so as to be supported by the lower cover 77 of the remote controller 4 so that its distal end may be moved towards and away from the second cord reel 15. A roll 88 is rotatably mounted at the distal end of the slack take-up lever 84. The rotary shaft of the roll 86 is mounted in a direction parallel to the rotary axis of the second cord reel 15, as indicated by arrow N in FIG. 4.

The slack take-up lever 84 thrusts the roll 86 against the second cord assembly 61 placed around the second cord reel 15 for preventing slack of the second cord assembly 61 when the second cord assembly is taken up by the second cord reel 15.

If, when the remote controller 4 is fitted into and held by the holder 17 for the remote controller 4 provided within the main body portion 1, the operation of canceling the inhibition of rotation of the first cord reel 29 is performed, the first inhibition mechanism actuates the second inhibition mechanism in association with the canceling operation for canceling the inhibition of rotation of the second cord reel 15.

That is, when the cord capturing slider 20 is slid in a direction against the bias of the tension coil spring 40, as indicated by arrow B in FIG. 2, the inhibition canceling lever 35 shifts an actuating pawl 38 formed on the opposite end thereof in a direction of the sliding movement of the inhibiting slider 7 of the remote controller 4 positioned within the holder 17.

The actuating pawl 38 is intruded into the holder 17 via a through-hole 19 formed in the lateral surface of the holder 17.

Thus, when the remote controller d is disposed at a pre-set position in the holder 17, the activating pawl 38 shifts the inhibiting slider 7 against the bias of the spring plate portion of the inhibiting slider 7.

(vi) Remote Controller Holder

On the outer lateral surface of the main body portion 1, a pair of lock bars 24, 24, operating as contacts for actuating signals connected to the circuit substrate of the recording and/or reproducing unit, are provided within the holder 17, as shown in FIGS. 2 and 3. These lock bars 24, 24 are arranged in opposition to each other via a pair of through-holes 18, 18 formed on both lateral sides of the holder 17.

These lock bars 24, 24 are columnar-shaped and formed with a central reduced-diameter portion 71 and both end reduced-diameter portions 70, 70, as shown in FIGS. 8 to 11. These lock bars 24, 24 are supported with the axial direction thereof extending parallel to the bottom surface of the holder 17 and with the end reduced-diameter portions 70, 70 extending on both sides of the through-holes 18, 18 so as to be prohibited from being extricated out of the through-holes 18, 18.

Figure 8:
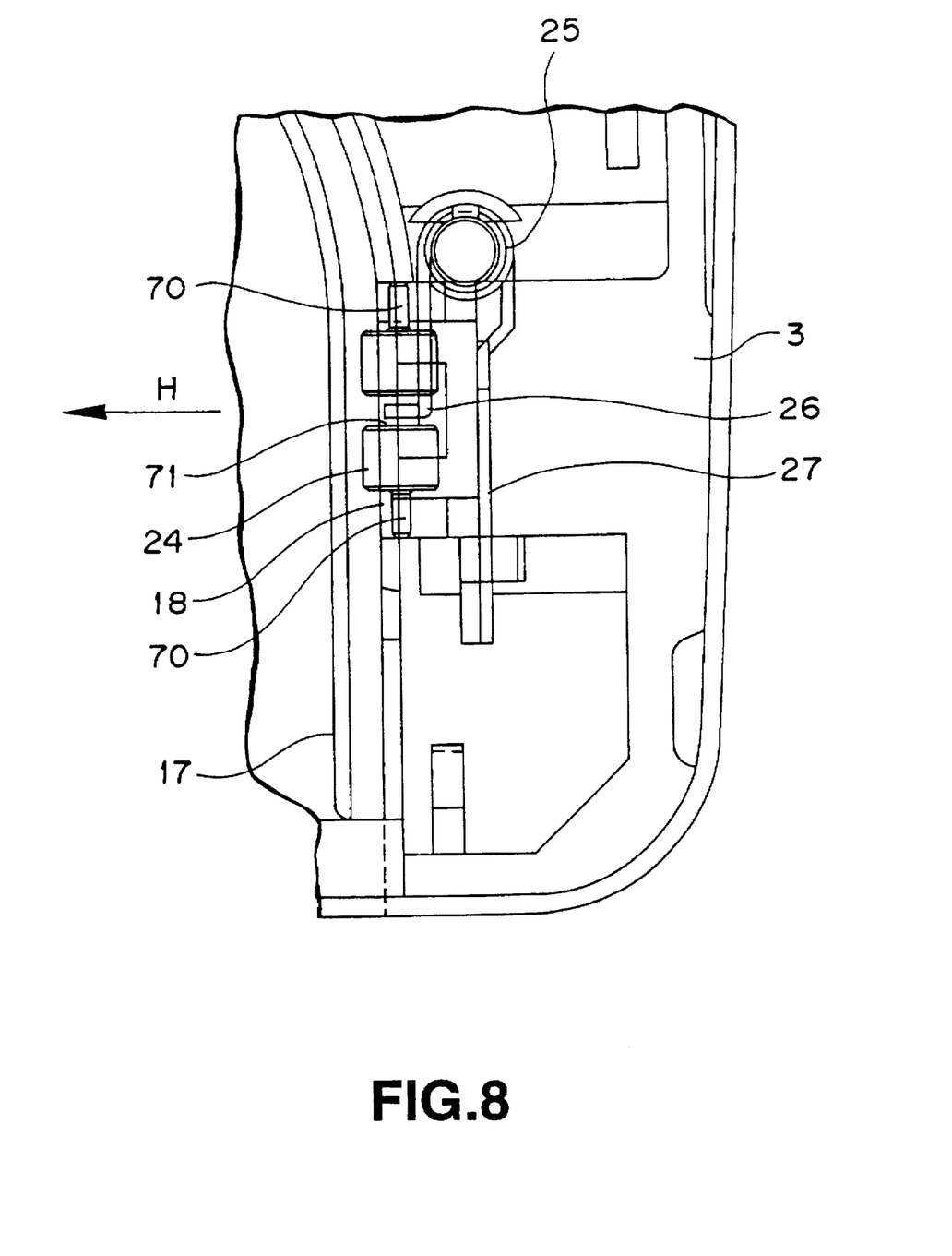
FIG. 8 is a plan view showing essential portions of a side of the outer casing of the main body portion of the tape recorder shown in FIG. 1, with an outer cover being removed.
Figure 9:
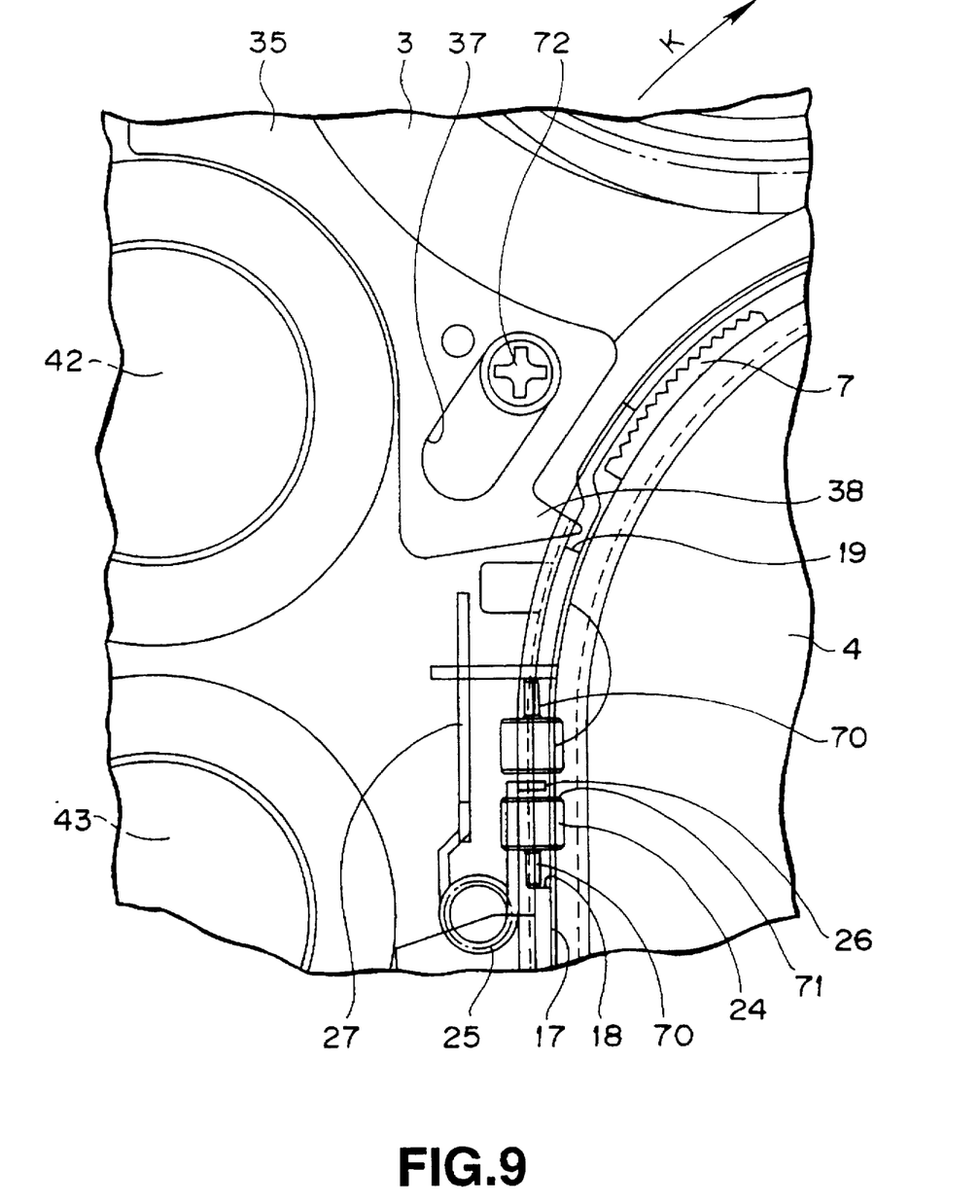
FIG. 9 is a plan view showing essential portions of the opposite side of the outer casing of the main body portion of the tape recorder shown in FIG. 1, with an outer cover being removed.
Figure 10:
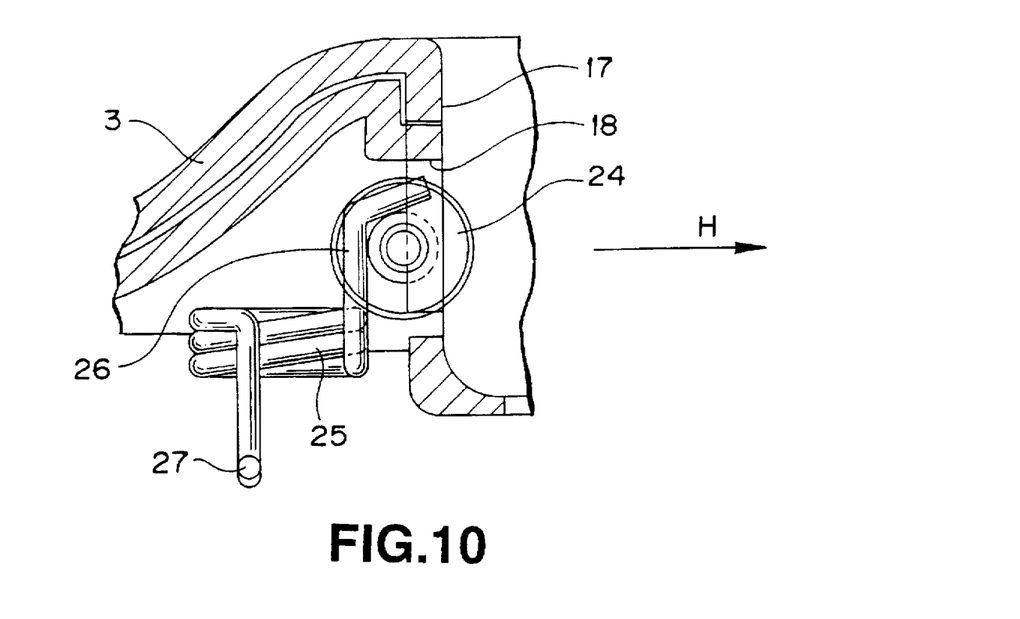
FIG. 10 is a longitudinal cross-sectional view showing essential portions of an arrangement of an outer casing of a main body portion of the tape recorder shown in FIG. 1.
Figure 11:
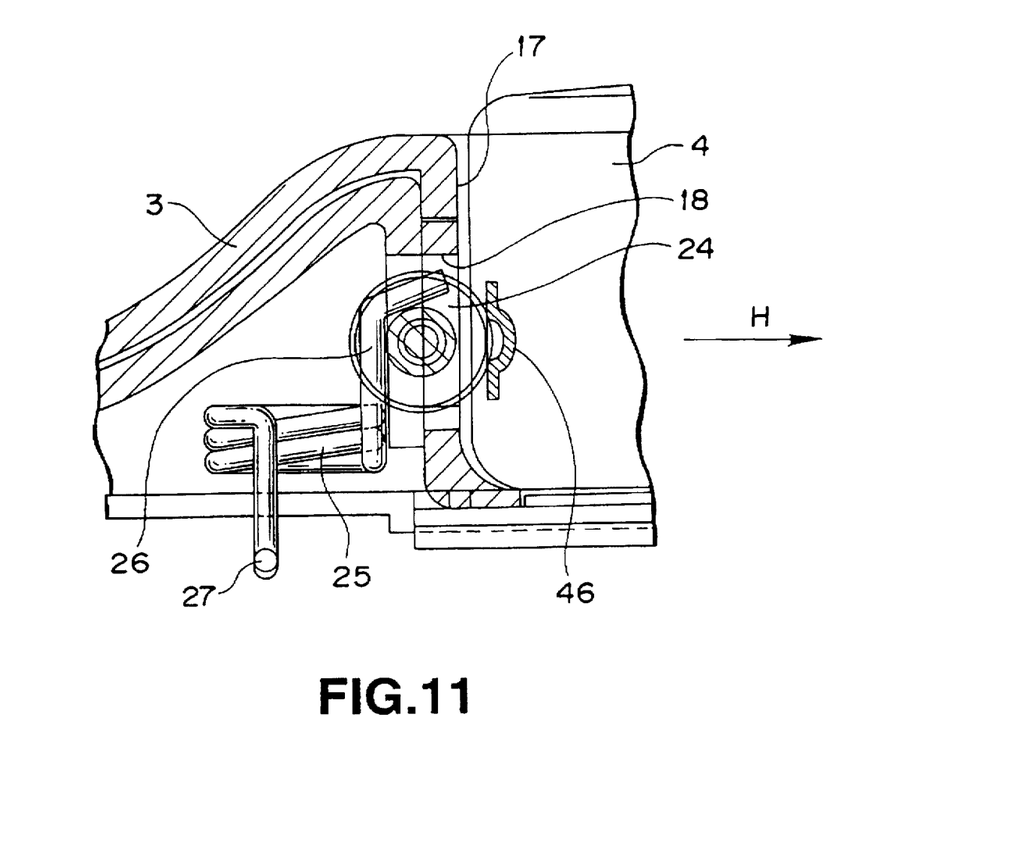
FIG. 11 is a longitudinal cross-sectional view showing essential portions of an outer casing of a main body portion of the tape recorder of FIG. 1 fitted with a remote controller.

As shown in FIGS. 8 to 11, the lock bars 24, 24 are biased by a pair of torsion coil springs 25, 25 mounted on the back surface of the front panel 3 into movement in a direction towards the inside of the holder 17, that is in a direction of being protruded outward via the though-holes 18, 18, as indicated by arrow H in FIGS. 8, 10 and 11. Each coil spring 25 has its one arm 27 retained by the back surface of the front panel 3 while having its opposite side arm 26 abutted against the central reduced-diameter portion 71.

When the remote controller 4 is fitted into the inside of the holder 17, the lock bars 24, 24 are engaged in the recesses of the lock groove members 46, 48 from both lateral sides of the remote controller 4, as shown in FIG. 11.

The remote controller 4 is held at this time with respect to the holder 17 by the lock bars 24, 24.

The lock groove members 46, 46 are connected to the lock bars 24, 24, so that the operating signals are exchanged between the lock groove members 46, 46 and the circuit substrate of the recording and/or reproducing unit via these lock groove members 46, 46 and the lock bars 24, 24.

(vii) Headphone Holder

Figure 6:
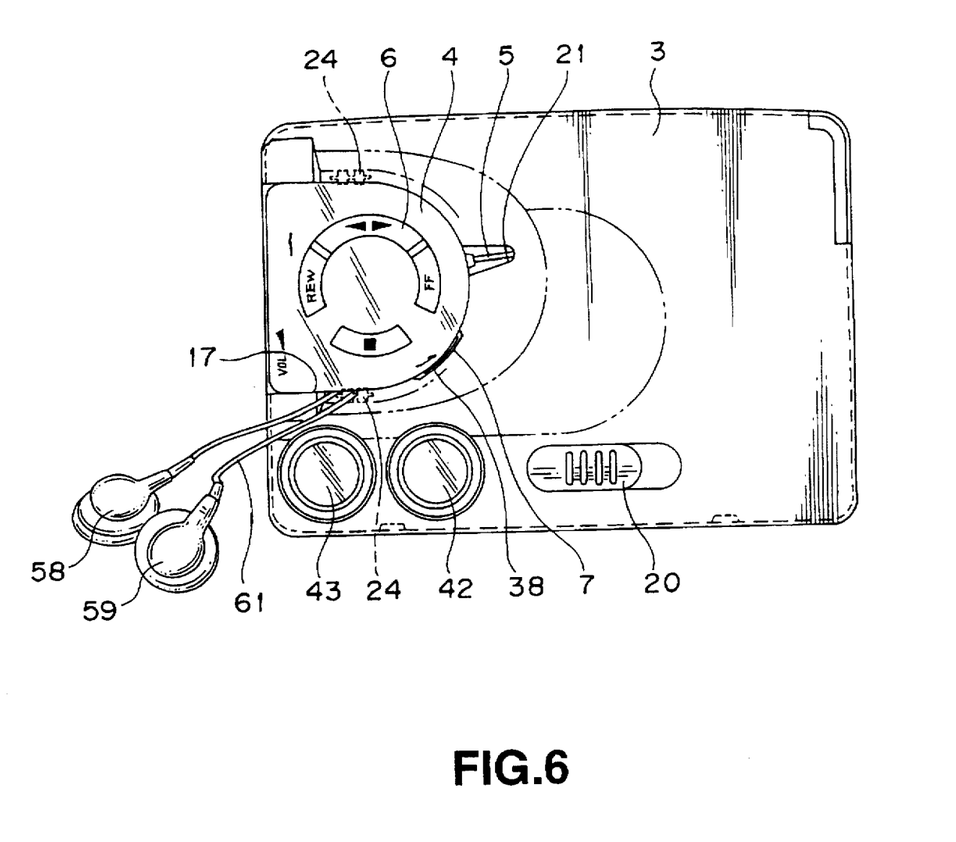
FIG. 6 is a plan view showing the tape recorder shown in FIG. 1, with a headphone device being pulled out.

On the front surface of the front panel 3, operating as the outer lateral surface of the main body portion 1, a pair of headphone holders 42, 43 are mounted, as shown in FIGS. 2 and 6.

Figure 13:
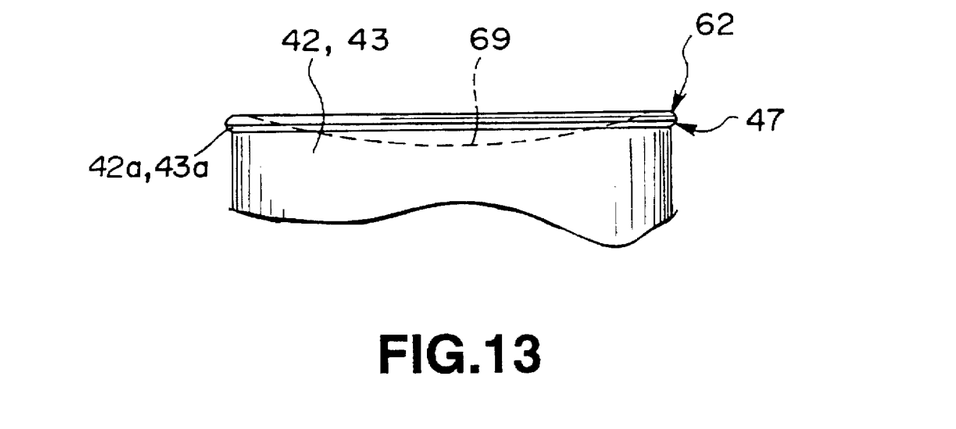
FIG. 13 is a side view showing an arrangement of a headphone device holder of the tape recorder of FIG. 1.

Each of the headphone holders 42, 43 is formed as a cylinder of a reduced height, having a diameter substantially corresponding to that of the front surface of each of the units 58, 59, by press-working the front panel 3 or by bonding correspondingly shaped members of synthetic resin material on the front surface of the front panel 3, so as to be protruded towards the front side of the front panel 3, as shown in FIG. 13.

The headphone holders 42, 43 are formed with flanges 42a, 43a, extending around the front-side perimeter thereof, respectively. The front and back sides of the flanges 42a, 43a are formed as an R-surface 62 and a C-surface 47, respectively. The R-surface 62 is a topic surface or a surface corresponding to a part of a spherical surface, while the C-surface 47 is a surface corresponding to a part of a conical surface.

The front side 69 of each of the headphone holders 42, 43 is concave-shaped for mating with the convex shape of the front surface of the speaker unit 68.

Figure 14:
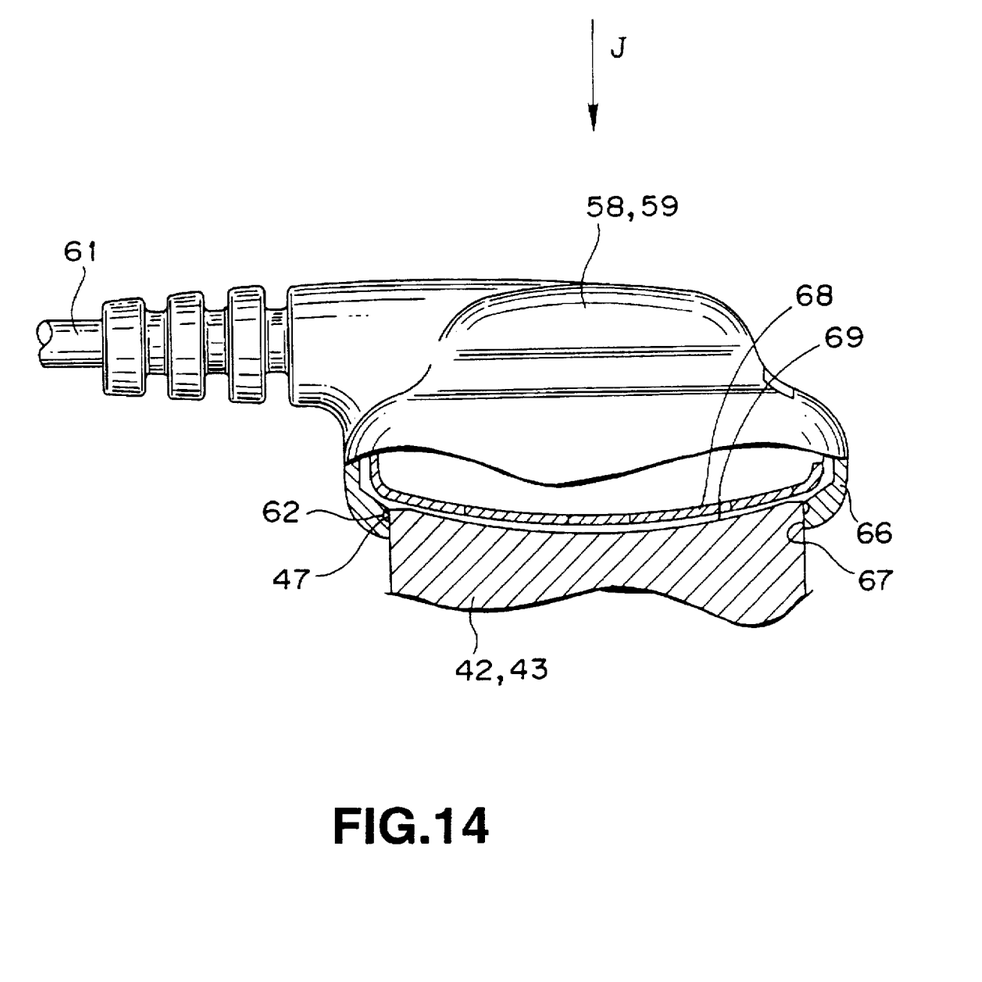
FIG. 14 is a side view showing the unit portion of the headphone device held by the headphone device holder.

The headphone holders 42, 43 hold the units 58, 59 by fitting the flanges 42a, 43a in the mouthpiece 67 of the cover 66, respectively, as shown in FIG. 14.

Since the cover 66 is formed of a flexible material, it is held by each of the headphone holders 42, 43 by having the inner rim of the mouthpiece 67 thrust against the flanges 42a, 43a, respectively, with the inner rim of the mouthpiece 67 then being deformed elastically.

Thus, the units 58, 59 are held by the headphone holders 42, 43 by being thrust towards the headphone holders 42, 43 as indicated by arrow J in FIG. 14. The units 58, 59 are also dismounted from the holders 42, 43 by being pulled away from the headphone holders 42, 43, that is, in a direction opposite to the direction of arrow J in FIG. 14, for being dismounted from the headphone holders 42, 43.

(viii) Operation of Tape Player

With the above-described tape player, the remote controller 4 can be held within the holder 17, while the units 58, 59 can be held by the headphone holders 42, 43, as shown in FIG. 3.

At this time, the cord capturing slider 20 can be actuated for taking up the first cord assembly 5 on the first cord reel 29 under the bias of the first winding spring 30, while the second cord assembly 81 can be taken up on the second cord reel 15 under the bias of the second winding spring 16.

With the present tape player, the units 58, 59 can be detached from the headphone holders 42, 43 and the second cord assembly 61 is pulled out from the second cord reel 15 as the second cord reel 15 is rotated against the bias of the second winding spring 16, as shown in FIG. 6.

If the tractive force applied to the units 58, 59 is removed in such state, the inhibiting slider 7 is engaged with the second ratchet wheel 14 for inhibiting rotation of the second ratchet wheel 14 under the bias of the second winding spring 16. The second cord assembly 61 then remains in the pulled-out state.

If the cord capturing slider 20 is actuated in this state, the inhibiting slider 7 is actuated by the inhibiting canceling lever 35, so that the second cord assembly 61 is taken up by the second core reel 15 under the bias of the second winding spring 16.

Figure 7:
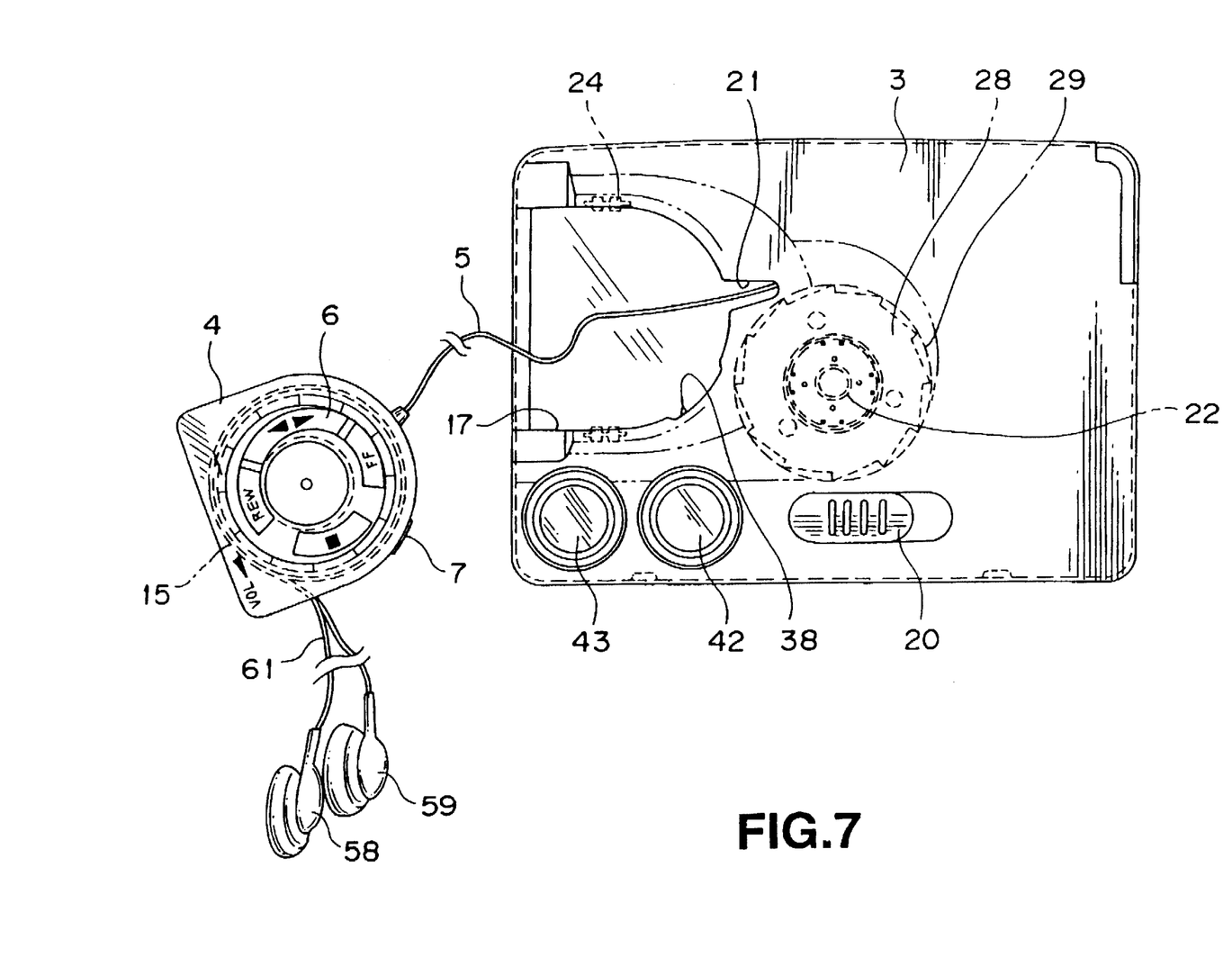
FIG. 7 is a plan view showing the tape recorder shown in FIG. 1, with the headphone device and the remote controller being pulled out.

With the present tape player, the remote controller 4 may be detached from the holder 17 and the first cord assembly 5 is pulled out from the first cord reel 29, while the first cord reel 29 may be pulled out of the first cord reel 29 as it is rotated against the bias of the first winding spring 30, as shown in FIG. 7.

If, at this state, the remote controller 4 ceases to be pulled, the inhibiting lever 31 is engaged with the first ratchet wheel 28 for inhibiting rotation of the first ratchet wheel 28 under the bias of the first winding spring 30, the first cord assembly 5 then remaining in the pulled-out state.

If the cord capturing slider 20 is actuated at this time, the inhibiting lever 31 is actuated by the inhibiting lever 35, so that the first cord assembly 5 is taken up by the first cord reel 29 under the bias of the first winding spring 30.

If, with the present tape player, the playback switch PLAY of the remote controller 4 is actuated while the tape cassette is housed within the cassette housing section 1a and the cassette lid 4 is rotated into abutment with the chassis 2, the playback switch (PLAY) of the remote controller 4 is actuated, the playback mode of reading out acoustic signals from a magnetic tape of the tape cassette is executed.

If the remote controller 4 is held within the holder 17, an actuating signal indicating the actuation of the respective switches of the remote controller 4 is fed to the circuit substrate of the recording and/or reproducing unit not only via the first cord assembly 5, but also via the lock groove members 46, 46. Thus, the exchange of the actuation signals with the circuit substrate of the recording and/or reproducing unit is not affected by possible cord breakage of the first cord assembly 5.

If the remote controller 4 is dismounted from the holder 17, an operating signal indicating actuation of the respective switches of the remote controller 4 are fed via the first cord assembly 5 to the circuit substrate of the recording and/or reproducing unit.

The sound signals read out from the magnetic tape are fed as electrical signals to output jacks, not shown, provided on the lateral surface of the chassis 2 and to the headphone device 57.

The headphone device 57 is fed at the units 58, 59 with acoustic signals from the recording and/or reproducing unit via the first and second cord assemblies 5, 61, and converts these acoustic signals into audible sound by the respective speaks 68, 68 of the units 58, 59.

The output jacks face outward via headphone jack openings 44 formed in the lateral sides of the front panel 3 and are connected to a headphone device distinct from the above-mentioned headphone device 57.

With the fast feed and rewind modes, the tape player feeds the magnetic tape at a high speed for promptly locating the playback position on the magnetic tape.

The recording and/or reproducing apparatus according to the present invention includes not only the tape player of the above-described embodiment but also a variety of recording/reproducing apparatus, such as tape recorder, video tape recorder, disc recorder or disc player.

Also the recording medium employed in the disc recorder or disc player encompasses information signal recording discs, such as optical disc, magnetic disc or a magneto-optical disc.

What is claimed is:

1. A recording and/or reproducing apparatus comprising:
   recording and/or reproducing means for recording and/or reproducing information signals on or from a recording medium;
   a main body for housing said recording and/or reproducing means;
   electro-acoustic transducing means receiving information signals reproduced by said recording and/or reproducing means;
   connection means for interconnecting said electro-acoustic transducing means and said recording and/or reproducing means;
   first take-up means provided in said main body for taking up said connection means;
   second take-up means provided partway along a length of said connection means also for taking up said connection means, said second connection means adapted for being mounted on and dismounted from said main body, wherein said second take-up means is arranged in an actuating input controller connected to said recording and/or reproducing means by said connection means and being actuatable by a user of the recording and/or reproducing apparatus for selecting the recording or reproducing operation of said recording and/or reproducing means; and
   actuating means for causing said first take-up means and said second take-up means to take-up said connection means.

2. The recording and/or reproducing apparatus as claimed in claim 1 wherein said first take-up means has a rotatable first take-up section for taking up said connection means and a first rotation inhibiting section for inhibiting rotation of said first take-up section, said second take-up means has a rotatable second take-up section for taking up said connection means and a second rotation inhibiting section for inhibiting rotation of said second take-up section wherein upon actuation said actuating means cancels the rotation inhibiting state of said first take-up section by said first rotation inhibiting section and the rotating inhibiting state of said second take-up section by said second rotation inhibiting section.

3. The recording and/or reproducing apparatus as claimed in claim 1 wherein said main body has a housing section for housing said second take-up means, said housing section having output means for supplying information signals from said recording and/or reproducing means via said take-up means to said electro-acoustic transducing means, said take-up means having input mean fed with information signals from said output means and feeding the input signals to said electro-acoustic transducing means.

4. The recording and/or reproducing apparatus as claimed in claim 1 further comprising input/output means for exchanging information signals between the main body and the actuating means in a state in which said second take-up means is housed within said main body.

5. The recording and/or reproducing apparatus as claimed in claim 4 wherein said main body has a housing section for housing said second take-up means, said input/output means having a first input/output section provided in said housing section for supplying information signals from said recording and/or reproducing means to said electro-acoustic transducing means via said take-up means when the second tape-up means is housed within said main body, and a second input/output section provided in said take-up means for supplying information signals from said first input/output section to said electro-acoustic transducing means and for outputting information signals from said actuating input means to said input/output means.

6. A recording and/or reproducing apparatus comprising:
   recording and/or reproducing means for recording and/or reproducing information signals on or from a recording medium;
   a main body for housing said recording and/or reproducing means;
   electro-acoustic transducing means receiving information signals reproduced by said recording and/or reproducing means;
   actuating input means for setting and switching operating states of said recording and/or reproducing means, said actuating input means being adapted to be mounted on and dismounted from said main body;
   first connection means for interconnecting said actuating input means and said recording and/or reproducing means and for exchanging information signals between the actuating input means and said recording and/or reproducing means;

second connection means interconnecting said electro-acoustic transducing means and said actuating input means;

first take-up means provided in said main body for taking up said first connection means;

second take-up means provided in said actuating input means for taking up said second connection means;

input/output means for exchanging information signals between the main body and the actuating input/output means when said acutating input means is mounted on said main body; and actuating means for causing said first take-up means and the second take-up means to take up said connection means.

7. The recording and/or reproducing apparatus as claimed in claim 6 wherein said main body has a housing section for housing said actuating input means, said input/output means having a first input/output section provided in said housing section for supplying information signals from said recording and/or reproducing means to said second take-up means when said actuating input means is housed within said main body in said housing section, and a second input/output section provided in said second take-up means for supplying input information signals from said first input/output section to said electro-acoustic transducing means and for outputting information signals from said actuating input means to said first input/output means.

8. The recording and/or reproducing apparatus as claimed in claim 6 wherein input information signals from said actuating input means are supplied via said input/output means to said recording and/or reproducing means and also supplied via said first connection means to said recording and/or reproducing means.

9. The recording and/or reproducing apparatus as claimed in claim 6 wherein said first take-up means has a first take-up section for taking up said connection means and a first rotation inhibiting section for inhibiting rotation of said first take-up section, said second take-up means has a second take-up section for taking up said connection means and a second rotation inhibiting section for inhibiting rotation of said second take-up section, said actuating means on being actuated cancels the rotation inhibiting state of said first take-up section by said first rotation inhibiting section and the rotation inhibiting state of said second take-up section by said second rotation inhibiting section.

* * * * *